US010685062B2

(12) United States Patent
Singh et al.

(10) Patent No.: US 10,685,062 B2
(45) Date of Patent: Jun. 16, 2020

(54) RELATIONAL DATABASE MANAGEMENT

(71) Applicant: Microsoft Technology Licensing, LLC, Redmond, WA (US)

(72) Inventors: Sameer Singh, Amherst, MA (US); Thore Kurt Hartwig Graepel, Cambridge (GB); Lucas Julien Bordeaux, Cambridge (GB); Andrew Donald Gordon, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 1040 days.

(21) Appl. No.: 13/731,800

(22) Filed: Dec. 31, 2012

(65) Prior Publication Data

US 2014/0188928 A1    Jul. 3, 2014

(51) Int. Cl.
*G06F 16/901* (2019.01)
*G06F 16/2458* (2019.01)
*G06F 16/21* (2019.01)

(52) U.S. Cl.
CPC .......... *G06F 16/9024* (2019.01); *G06F 16/21* (2019.01); *G06F 16/2462* (2019.01)

(58) Field of Classification Search
CPC ......... G06F 17/30536; G06F 17/30958; G06F 17/30303; G06N 7/005; G06N 99/005
USPC .................................................. 707/999.009
See application file for complete search history.

(56) References Cited

U.S. PATENT DOCUMENTS

| | | | |
|---|---|---|---|
| 5,701,400 A | 12/1997 | Amado | |
| 6,581,058 B1 | 6/2003 | Fayyad et al. | |
| 6,985,895 B2 | 1/2006 | Witkowski et al. | |
| 7,363,299 B2* | 4/2008 | Dalvi | G06F 17/30542 |
| 7,398,268 B2 | 7/2008 | Kim et al. | |
| 7,567,968 B2 | 7/2009 | Desai et al. | |
| 7,587,685 B2 | 9/2009 | Wallace | |
| 7,814,113 B2* | 10/2010 | Suciu | G06F 17/30687 707/713 |
| 8,145,669 B2* | 3/2012 | Cormode et al. | 707/780 |

(Continued)

OTHER PUBLICATIONS

Lakshmanan, Laks VS, Nicola Leone, Robert Ross, and Venkatramanan Siva Subrahmanian. "Probview: A flexible probabilistic database system." ACM Transactions on Database Systems (TODS) 22, No. 3 (1997): 419-469.*

(Continued)

*Primary Examiner* — Jesse P Frumkin

(57) ABSTRACT

New methods of relational database management are described, for example, to enable completion and checking of data in relational databases, including completion of missing foreign key values, to facilitate understanding of data in relational databases, to highlight data that it would be useful to add to a relational database and for other applications. In various embodiments, the schema of a relational database is used to automatically create a probabilistic graphical model that has a structure related to the schema. For example, nodes representing individual rows are linked to rows of other tables according to the database schema. In examples, data in the relational database is used to carry out inference using inference algorithms derived from the probabilistic graphical model. In various examples, inference results, comprising probability distributions each for an individual table cell, are used to fill missing data, highlight errors, and for other purposes.

20 Claims, 10 Drawing Sheets

(56) References Cited

U.S. PATENT DOCUMENTS

| | | | |
|---|---|---|---|
| 8,234,295 B2* | 7/2012 | Haas | G06F 17/30536 |
| | | | 707/769 |
| 8,364,612 B2* | 1/2013 | Van Gael | G06N 99/005 |
| | | | 706/12 |
| 9,418,086 B2* | 8/2016 | Gordon | G06F 17/30292 |
| 2002/0103793 A1* | 8/2002 | Koller et al. | 707/3 |
| 2003/0149603 A1 | 8/2003 | Ferguson et al. | |
| 2004/0059518 A1 | 3/2004 | Rothschild | |
| 2005/0060191 A1 | 3/2005 | Parkins et al. | |
| 2005/0273311 A1 | 12/2005 | Lautt et al. | |
| 2006/0206477 A1 | 9/2006 | Dalvi et al. | |
| 2007/0043755 A1* | 2/2007 | Rolleke | G06F 17/30536 |
| 2007/0168329 A1* | 7/2007 | Haft et al. | 707/3 |
| 2007/0214133 A1* | 9/2007 | Liberty | G06F 17/3064 |
| 2008/0114801 A1* | 5/2008 | Singh | G06F 17/30306 |
| 2008/0168341 A1 | 7/2008 | Payette | |
| 2009/0055364 A1 | 2/2009 | Mandadi et al. | |
| 2009/0144218 A1* | 6/2009 | Bonawitz | G06N 7/005 |
| | | | 706/52 |
| 2009/0319458 A1 | 12/2009 | Minka et al. | |
| 2009/0325709 A1 | 12/2009 | Shi | |
| 2010/0169758 A1 | 7/2010 | Thomsen | |
| 2010/0312775 A1* | 12/2010 | Haas et al. | 707/759 |
| 2011/0066577 A1* | 3/2011 | Van Gael | G06N 99/005 |
| | | | 706/12 |
| 2012/0136896 A1* | 5/2012 | Tseng | G06F 17/18 |
| | | | 707/780 |
| 2012/0303410 A1* | 11/2012 | Connors | G06Q 10/087 |
| | | | 705/7.31 |
| 2012/0303555 A1* | 11/2012 | Yakout | G06F 17/30303 |
| | | | 706/12 |
| 2013/0036082 A1* | 2/2013 | Natarajan | G06Q 30/00 |
| | | | 706/47 |
| 2013/0226842 A1* | 8/2013 | Chu | G06N 99/005 |
| | | | 706/12 |
| 2013/0275393 A1* | 10/2013 | Kaldas | G06F 17/30303 |
| | | | 707/692 |
| 2013/0290368 A1* | 10/2013 | Chen | G06F 17/30536 |
| | | | 707/769 |
| 2013/0311517 A1* | 11/2013 | Kementsietsidis | |
| | | | G06F 17/30533 |
| | | | 707/798 |
| 2013/0346844 A1* | 12/2013 | Graepel | G06F 17/18 |
| | | | 715/219 |
| 2014/0207493 A1* | 7/2014 | Sarrafzadeh | A61B 5/7264 |
| | | | 705/3 |
| 2014/0250041 A1* | 9/2014 | Vigoda | 706/46 |

OTHER PUBLICATIONS

Wong, SK Michael, Cory J. Butz, and Yang Xiang. "A method for implementing a probabilistic model as a relational database." In Proceedings of the Eleventh conference on Uncertainty in artificial intelligence, pp. 556-564. Morgan Kaufmann Publishers Inc., 1995.*
Huang, Jiewen, Lyublena Antova, Christoph Koch, and Dan Olteanu. "MayBMS: a probabilistic database management system." In Proceedings of the 2009 ACM SIGMOD International Conference on Management of data, pp. 1071-1074. ACM, 2009.*
Farhangfar, Alireza, Lukasz A. Kurgan, and Witold Pedrycz. "A novel framework for imputation of missing values in databases." IEEE Transactions on Systems, Man, and Cybernetics—Part A: Systems and Humans 37, No. 5 (2007): 692-709.*
Computational Cognitive Science. Lecture Notes [online]. Massachusetts Institute of Technology Open Courseware, 2004 [retrieved on Jul. 5, 2018]. Retrieved from the Internet: <URL: https://ocw.mit.edu/courses/brain-and-cognitive-sciences/9-66j-computational-cognitive-science-fall-2004/lecture-notes/>. (Year: 2004).*
Benjelloun, Omar, Anish Das Samna, Alon Halevy, Martin Theobald, and Jennifer Widom. "Databases with uncertainty and lineage." The VLDB Journal—The International Journal on Very Large Data Bases 17, No. 2 (2008): 243-264. (Year: 2008).*
Sen, Prithviraj. "Representing and Querying uncertain data." PhD diss., 2009. (Year: 2009).*
Zhang, Wenjie. "Efficiently and effectively processing probabilistic queries on uncertain data." PhD diss., University of New South Wales, Sydney, Australia, 2010. (Year: 2010).*
Koller, Daphne, and Friedman, Nir. Probabilistic graphical models: Principles and techniques. MIT press, 2009 ("Koller"). (Year: 2009).*
Sen, Prithviraj, "Representing and Querying Uncertain Data", In a Dissertation Submitted in Partial Fulfillment of Requirements for the Degree of Doctor of Philosophy to the Department of Computer Science, Apr. 1, 2011, 123 pages.
Dalvi, et al., "Probabilistic Databases: Diamonds in the Dirt* (Extended Version)", In Communications of the ACM—Barbara Liskov, vol. 52, Issue 7, Jul. 2009, 9 pages.
Li, et al., "Structure Learning of Probabilistic Relational Models from Incomplete Relational Data", In 18th European Conference on Machine Learning, Sep. 17, 2007, 12 pages.
Bravo, et al., "Optimizing MPF Queries: Decision Support and Probabilistic Inference", In ACM SIGMOD International Conference on Management of Data, Jun. 11, 2007, 12 pages.
Getoor, et al., "Learning Probabilistic Models of Relational Structure", Retrieved on: Nov. 27, 2012, Available at: http://ai.stanford.edu/users/nir/Papers/GFTK1.pdf.
Wang, et al., "Hybrid In-Database Inference for Declarative Information Extraction", In ACM SIGMOD International Conference on Management of Data, Jun. 12, 2011, 12 pages.
Unknown Author, "Spreadsheet Column Fill", Published on: Apr. 7, 2010, Available at: http://www.vsni.co.uk/products/genstat/htmlhelp/spread/FillColumn.htm.
Prior Knowledge, Inc. "Veritable API Overview" downloaded from the Internet on Apr. 26, 2012, 3 pages long.
Barga, Roger et al., Microsoft Research, "Excel DataScope", 3 pages long downloaded from the Internet on May 17, 2012.
Chung, Afzal, Hsiao, "A Software System Development for Probabilistic Relational Database Applications for Biomedical Informatics", retrieved on Aug. 7, 2009 at <<http://ieeexplore.ieee.org/stamp/stamp.jsp?tp=&arnumber=5136782&isnumber=5136572>>, IEEE Computer Society, International Conference on Advanced 0 Information Networking and Applications Workshops, 2009, pp. 1002-1007.
Getoor, "Structure Discovery using Statistical Relational Learning", retrieved on Aug. 7, 2009 at <<ftp://ftp.research.microsoft.com/pub/debuii!A03septlgetoor.ps>>, Bulletin of the IEEE Computer Society Technical Committee on Data Engineering, 2003, pp. 1-8.
Langkilde-Geary, "Declarative Syntactic Processing of Natural Language Using Concurrent Constraint Programming and Probabilistic Dependency Modeling", retrieved on Aug. 7, 2009 at <<http://www.mt-archive.info/MTS-2007-Langkilde-Geary.pdf>>, Proceedings of UCNLG, 2007, pp. 55-63.
Lunn, Thomas, Best, Spiegelhalter, "WinBUGS—A Bayesian modelling framework Concepts, structure, and extensibility", Statistics and Computing, vol. 10, 2000, pp. 325-337.
Sato, Kawashima, Kitagawa, "The Integration of Data Streams with Probabilities and Relational Database using Bayesian Networks", retrieved on Aug. 7, 2009 at <<http://ieeexplore.ieee.org/stamp/stamp.jsp?tp=&arnumber=4839091&isnumber=4839076>>, Proceedings of the 2008 Ninth International Conference on Mobile Data Management Workshops, 2008, pp. 114-121.
Singh, Mayfield, Shah, Prabhakar, Hambrusch, Neville, Cheng, "Database Support for Probabilistic Attributes and Tuples", retrieved on Aug. 7, 2009 at <<http://orion.cs.purdue.edu/docs/model.pdf>>, IEEE 24th International Conference on Data Engineering, 2008, pp. 1053-1061.
Singh, Mayfield, Mittal, Prabhakar, Hambrusch, Shah, "The Orion Uncertain Data Management System", retrieved on Aug. 7, 2009 at <<http://www.cse.iitb.ac.in/-comad/2008/PDFs/orion2-demo.pdf>>, Computer Society of India, International Conference on Management of Data (COMAD 2008), Dec. 17, 2008, pp. 1239-1242.
Graepel et al. US Patent application filed Jun. 22, 2012, U.S. Appl. No. 13/530,121 "Checking and/or completion for data grids".

(56) References Cited

OTHER PUBLICATIONS

Getoor, "Introduction to Statistical Relational Learning", Chapters 6,7 and 8, MIT Press, 2007.
Friedman, Getoor, Koller, Pfeffer, "Learning Probabilistic Relational Models"; retrieved at http://ijcai.org/Past%20Proceedings/IJCAI-99%20VOL-2/PDF/090.pdf , pp. 1300-1309, 1999.
Nilesh Dalvi, Christopher Re, and Dan Suciu, Probabilistic databases: diamonds in the dirt, Communications of the ACM, 52(7):86-94, Jul. 2009. ISSN 0001-0782. doi: I0.1145/1538788.1538810. URL http: I /doi.acm.org/10.1145/1538788.1538810.
Singh et al. Dec. 5, 2012 NIPS "Compiling Relational Database Schemata into Probabilistic Graphical Models" http://arxiv.org/pdf/1212.0967v1.pdf.
David Heckerman. Christopher Meek. and Daphne Koller. Probabilistic models for relational data. Technical Report MSR-TR-2004-30, Microsoft Research, 2004.
Jennifer Hoeting, David Madigan, Adrian Raftery, and Chris Volinsky. Bayesian model averaging: A Tutorial Statistical Science, 14:382-401, 1999. URL http://www.stat.colostate.edu/~jah/papers/statsci.pdf.
Tomasz Imielinski and Witold Lipski, Jr. Incomplete information in relational databases. Journal of the ACM, 31(4):761 791 1984 Journal of the ACM, 31(4):761 791 URL http://doi.ann.org/10.1145/1634.1886.
Ravi Jampani, Fei Xu, Mingxi Wu, Luis Leopoldo Perez, Christopher Jermaine, and Peter J. Haas. MCDB: a Monte Carlo approach to managing uncertain data. In ACM SIGMOD international Conference on Management of data, SIGMOD 08, pp. 687 700, New York, NY, USA, 2008. ACM. ISBN 978-1-60558-102-6. doi: 10.1145/1376616.1376686. URL http://doi.acm.org/10.1145/1376616.1376686.
Charles Kemp, Joshua B. Tenenbaum, Thomas L. Griffiths. Takeshi Yamada, and Naonori Ueda. Learning systems of concepts with an infinite relational model. In American Assocaiton of Artifical intelligence (AAAI), AAAI'06, pp. 381-388. AAAI Press, 2006. ISBN 978-1-57735-281-5. URL http://dl.acm.org/citation.cfm?id=1597538.1597600.
Stanley Kok and Pedro Domingos. Statistical predicate invention. In international conference on Machine Learning (ICML), 2007. URI. http://alchemy.es.washington.edu/papers/kok07/kok07.pdf.
Sriraam Natarajan, Tushar Khot, Kristian Kersting, Bernd Gutmann, and Jude Shavlik. Gradient-based boosting for statistical relational learning: The relational dependency network case. Machine Learning, 86(1):25 5G, Jan. 2012. ISSN 0885-6125. doi: 10.1007 /s10994-0ll-524•1-9. URL http://dx.doi.org/10.1007/s10994-011-5244-9.
Aniruddh Nath and Pedro Domingos. Learning multiple hierarchical relational clusterings. In ICML Workshop on Statistical Relational Learning (SRL), 2012. URL http://www.cs.washington.edu/homes/nath/papers/nath-domingos12.pdf.
Jennifer Neville and David Jensen. Relational dependency networks. Journal of Machine Learning-Research, 8:653 692, May 2007. ISSN 1532-4435.URL http://dl.acm.org/citation.cfm?id=1248659.1248683.
Prithviraj Sen. Amol Deshpande, and Lise Gctoor. Prdb: managing and exploiting rich correlations in probabilistic databases. International Journal on Very Large Data Bases (VLDB), 18(5):1065-1090, Oct. 2009. ISSN 1066-8888. doi: 10.1007/s00778-009-0153-2. URL http://dx.doi.org/10.1007/s00778-009-0153-2.
Patrick Shafto, Charles Kemp, Vikash Mansinghka, Matthew Gordon, and Joshua B.Tenenbaum. Learning cross-cutting systems of categories. Annual Conference of the Cognitive Science Society, 2006. URL http://web.mit.edu/cocosci/Papers/shafto_etal_cogsci06.pdf.
Ben Taskar, Pieter Abbeel, and Daphne Koller. Discriminative probabilistic models for relational data. In Uncertainty in Artificial Intelligence (UAI), pp. 485-492, San Francisco, CA, USA, 2002. Morgan Kaufmann Publishers Inc. ISBN 1-55860-897-4.URL http://dl.acm.org/citation.cfm?id=2073876.2073934.
Daisy Zhe Wang, Eirinaios Michelakis, Minos Garofalakis, and Joseph M. Hellerstein. Bayesstore: Managing large, uncertain data repositories with probabilistic graphical models. In Conference on Very Large Data Bases (VLDB), 2008.
Michael Wick, Andrew McCallum, and Gerome Miklau. Scalable probabilistic databases with factor graphs and mcmc. In Conference on Very Large Data Bases (VLDB),vol. 3, pp. 794 804. VLDB Endowment, Sep. 2010. URL http://dl.acm.org/citation.cfm?id=1920841.1920942.
Eugene Wong. A statistical approach to incomplete information in database systems. AGM Transactions on Database Systems (TODS), 7(3):470-488, 1982. ISSN 0362-5915. doi: 10.1145/319732.319747. URL http://doi.acm org/10 .1145/319732.319747.
Zhao Xu, Volker Tresp, Kai Yu, and Hans-Peter Kriegel. Infinite hidden relational models. In Annual Conference on Uncertainty in Artificial Intelligence (UAI), pp. 544-551, Arlington, Virginia. 2006. AUAI Press.
"Non Final Office Action Issued in U.S. Appl. No. 12/559,921", dated Mar. 28, 2012, 30 Pages.

\* cited by examiner

RELATIONAL DATABASE MANAGEMENT

BACKGROUND

Relational databases, which store tables of data where there are links between the tables, are used in many application domains such as accounting, product stock control, customer relationship management, product recommendation systems and others. Administrators of relational databases who control data entry to the database typically strive for accuracy and quality of data in the database. This is because the accuracy and quality will influence control of downstream systems, actions or other event which occur as a result of the contents of the database. However, accuracy and quality of relational databases are often reduced for many reasons including human error, limitations in opportunities and time to obtain data, limitations in equipment used to observe data and others. Users may be aware of missing data in databases. However, in many situations users may be unaware of errors and inaccuracy in data present in databases.

The embodiments described below are not limited to implementations which solve any or all of the disadvantages of known relational database management systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

New methods for relational database management are described, for example, to enable completion, error detection, error correction of data in relational databases, including completion of missing foreign key values, to facilitate understanding of data in relational databases, to highlight data that it would be useful to add to a relational database and for other applications. In various embodiments, the schema of a relational database is used to automatically create a probabilistic graphical model that has a structure related to the schema. For example, nodes representing individual rows are linked to rows of other tables according to the database schema. In examples, data in the relational database is used to carry out inference using inference algorithms derived from the probabilistic graphical model. In various examples, inference results, comprising probability distributions each for an individual table cell, are used to fill missing data, highlight errors, and for other purposes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system the system described is provided as an example and not a limitation. As those skilled in the art will appreciate, the present examples are suitable for application in a variety of different types of computing device including but not limited to smart phones, tablet computers, game consoles, interactive entertainment systems and others.

Figure 1:
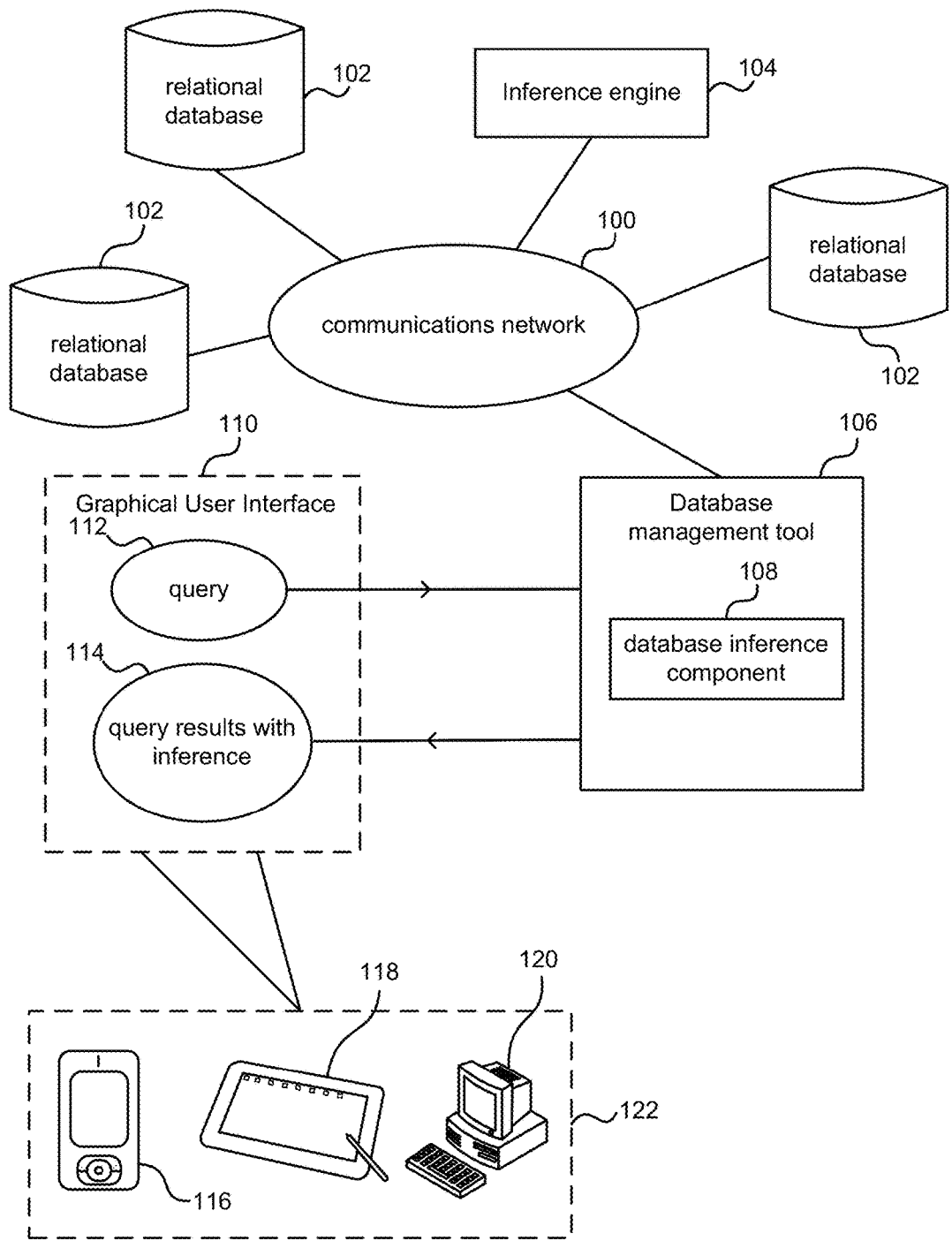
FIG. 1 is a schematic diagram of a database management tool for managing one or more relational databases.

FIG. 1 is a schematic diagram of a database management tool 106 which has an integral database inference component 108. The database management tool 106 is computer implemented, for example, it may be a software application for querying one or more relational databases 102 that are in communication with it over a communications network 100 such as the internet, an intranet or other communications network. The database management tool 106 has access to a database schema for each of the relational databases 102 it is able to access. The database management tool 106 may also enable a relational database to be created, edited or deleted although that is not essential. The database management tool 106 may enable data to be stored in one or more relational databases. A relational database comprises a plurality of tables of data where the tables are linked to one another. The term "relational database" is explained in more detail with reference to FIG. 2 below.

The database inference component 108 is also computer implemented, for example, as software and/or hardware logic. The database inference component is arranged to achieve inference using data in a relational database and to use the inference results to completing missing cells in tables of the relational database, check for errors, suggest corrections to errors, aid understanding of data in the database, identify data that it would be useful to obtain to add to the database and for other purposes. The database inference component 108 is arranged to automatically create a probabilistic graphical model given a relational database, or part of a relational database. It is able to work with an inference engine 104 to derive inference algorithms from the probabilistic graphical model and to carry out inference using those algorithms and data from the relational database (or part of the relational database). The database inference component 108 shown in FIG. 1 is integral with the database management tool 106 although this is not essential. The database inference component 108 may be located at any other entity which is in communication with the database management tool 106. The database inference component 108 may cache inference results it receives from the inference engine 104.

An end user is able to use the database management tool 106 and database inference component 108 using a graphical user interface 110 accessible from his or her computing device 122 such as a phone 116, tablet computer 118 or personal computer 120. The graphical user interface 110 may be web-based or may be of any other suitable type. Examples of graphical user interface displays which may be provided are discussed later with reference to FIGS. 7 to 9. The graphical user interface 110 may be provided by the database management tool 106, by the database inference component 108, or by any other entity in communication with the database management tool 106 and database inference component 108. By using the graphical user interface the end user is able to make use of the power of probabilistic inference even if he or she has no training in statistics or machine learning. Existing relational databases may be used without the need to export data from the existing relational databases and manipulate that data before carrying out machine learning and inference. Also, the end user does not need to pre-process data, for example, to transform variables of different types or remove examples with missing data. This simplifies operation for the end user. The end user may operate the relational database in the same way as previously done for relational databases as the inference happens in the background and the inference results may simply be incorporated with relational database query results.

The end user may input, using the graphical user interface 110, a query 112 to the database management tool 106 in order to send a query to one of the relational databases 102. The database management tool 106 returns a query result which is obtained from the relational database using known relational database processes. The database management tool 106 is also able to return a query result with inference 114. That is, where the results of the query comprise values and information which have been calculated by the database inference component 108. For example, cells which have no data may be completed by the database inference component 108 and the filled data may be returned as part of a query result with inference 114. This is possible even where the completed cells are completed with foreign key values. A foreign key is an entry in a table cell which refers to a row, tuple or record of another table. For example, cells which have erroneous data may be identified by the database inference component 108 and the errors and suggested corrections may be returned as part of a query result with inference 114. Many other examples of query results with inference 114 are possible as discussed in more detail below.

Because the relational databases and the inference engine may be located in the cloud large amounts of data may be available to the inference engine where those amounts may be larger than an amount of data which may practically and/or usefully be displayed at an end user device in a graphical user interface. By using large amounts of data at the inference engine the accuracy and certainty of predictions made by the inference engine may be increased.

Alternatively, or in addition, the functionality of any of the entities of FIG. 1, or any parts of those entities, can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 2:
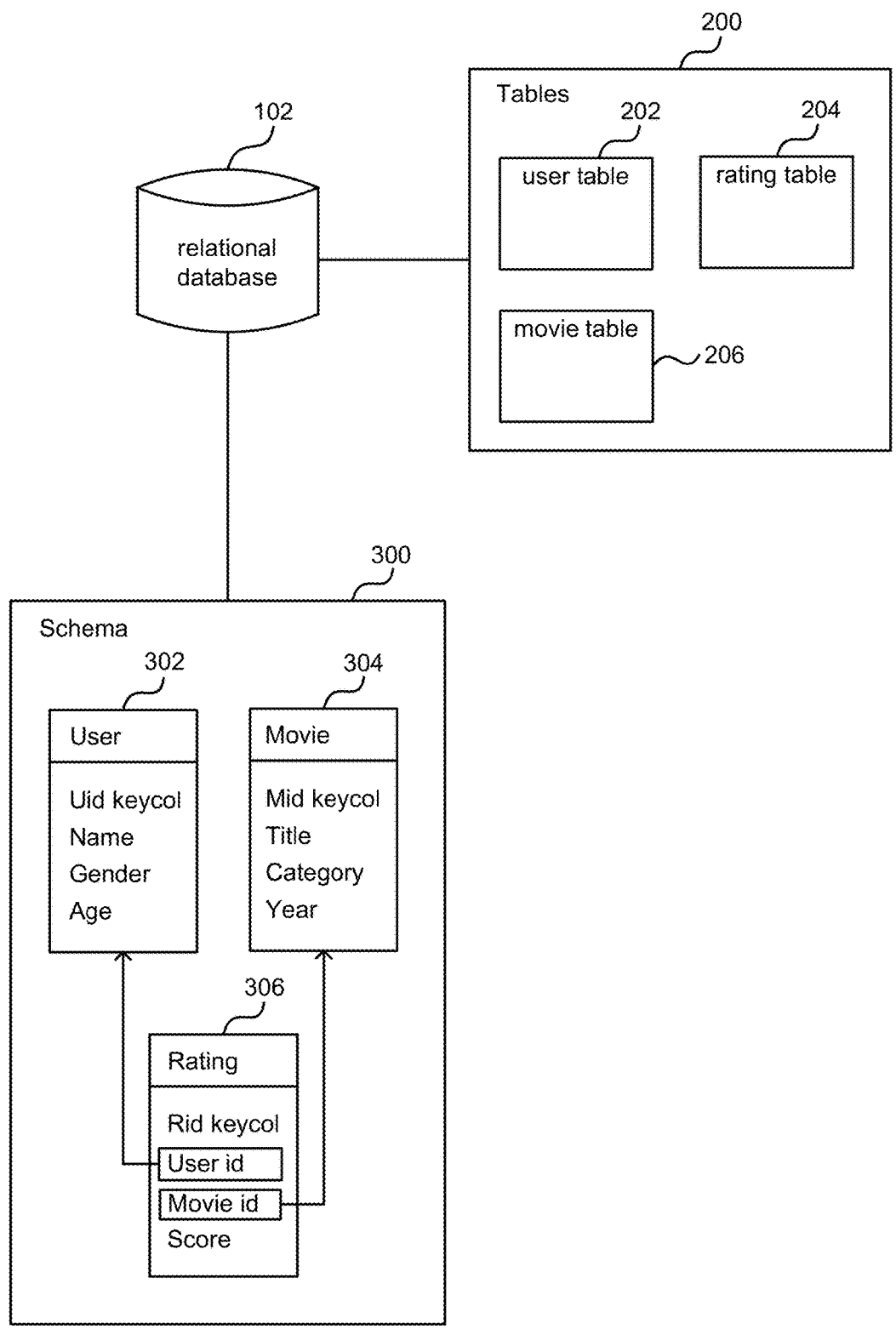
FIG. 2 is a schematic diagram of a relational database.

FIG. 2 is a schematic diagram of a relational database 102. As mentioned above a relational database comprises a plurality of tables 200 of data where the tables are linked to one another. Each table has cells of data arranged in columns and rows. In this example only three tables are shown for clarity although in practice many more tables may be present. The three tables in this example comprise a user table 202, a rating table 204 and a movie table 206. For example, the user table 202 comprises four columns (user key, name, gender, age) and one row for each user. For example, the movie table 206 comprises four columns (movie key, title, category, year) and one row for each user. For example, the rating table 204 comprises four columns which are for a rating key, two foreign keys, and a score. The two foreign keys may be a user key (referring to the user table) and a movie key (referring to the movie table).

A relational database has a schema which defines the tables it stores and links between those tables (also referred to as foreign keys). In the example of FIG. 2 a schema 300 of the relational database 102 is illustrated. The schema comprises, for each table, a description of the columns and, for each foreign key, knowledge of how that foreign key links two or more tables. In the example of FIG. 2 the schema 300 comprises a description of the columns of the user table 302, a description of the columns of the movie table 304 and a description of the columns of the rating table 306 as well as information about how the foreign keys in the rating table connect to the user table and the movie table.

As mentioned above, each table has cells of data arranged in columns and rows. The data values in the cells may be numerical or categorical or free text (strings) and some of the cells may be empty. An empty cell may be referred to as a cell having an unobserved data value or having a null data value. In the examples described herein the data in the one or more rows represent independent events, objects or entities. The data in the columns represent attributes and have a uniform type across rows; that is, data values within a column have the same type with the exception of missing values which may be marked empty, null or by some string such as "???". A non-exhaustive list of examples of types of data value is: float Boolean, categorical, integer, percentage, string, date, time.

Figure 3:
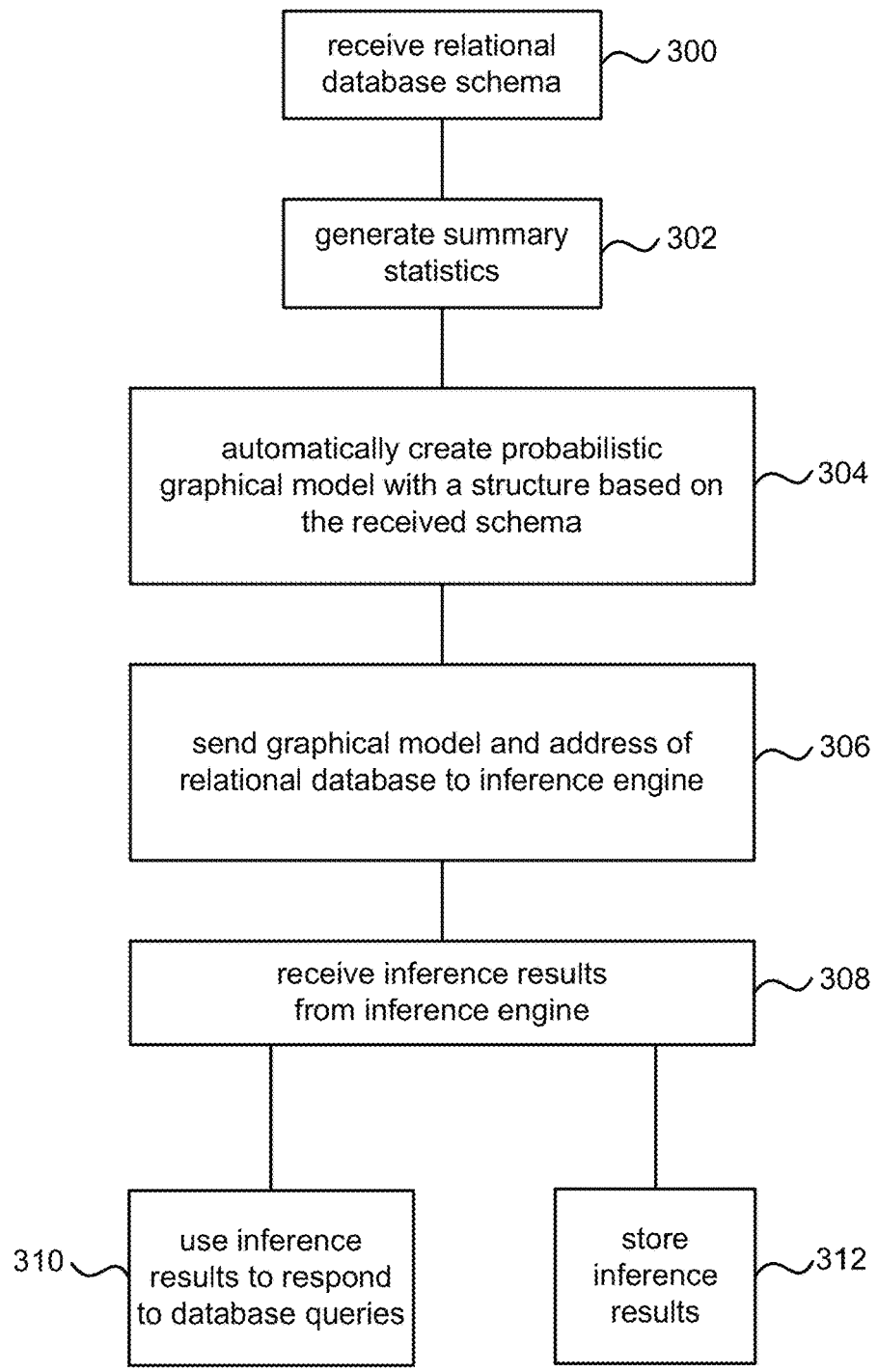
FIG. 3 is a flow diagram of a method at a database inference component.

FIG. 3 is a flow diagram of an example method at the database inference component 108 of FIG. 1. The database inference component 108 receives 300 a relational database schema and an address (or identifier) of all or part of a relational database which uses that schema and to which inference is to be applied. For example, the database management tool 106 knows the relational database schema of each of the relational databases 102 that it manages.

The database inference component 108 generates 302 summary statistics describing characteristics of data in the columns of all or part of the relational database to which inference is to be applied. For example, the summary statistics may define the type of the data in a column, whether data in a column should sum to a particular total such as 100 for percentages, whether the column is best omitted from inference, or other requirements. The database inference component 108 may generate the summary statistics automatically using rules or other criteria. For example, to determine data value types for the columns, the database inference component 108 may inspect the data grid. For example, a column may contain the symbols "0", "1", "2", "3", which may be interpreted as categories represented by numerals or which may be interpreted as numbers. The inference engine may infer the true underlying type by applying machine learning/statistical modeling. In some examples the process of identifying the data value types of the columns of the tables may be carried out by another entity in advance of operation of the database inference component 108. In some examples the database inference component uses the summary statistics to identify which columns not to model. For example, a column storing movie title may be omitted from the probabilistic graphical model because it is likely to contain values which are all different from one another and so difficult to generalize in the model.

When generating the summary statistics, the database inference component 108 may take into account user input specifying any prior information about data values in the database. In an example, a user may exclude one or more columns from inference by selecting columns at the graphical user interface. In the example described above with reference to FIG. 2 a user may exclude the user name columns from the user table and the movie title column from the movie table. In the same way a user may exclude one or more rows from inference. In another example, a user may specify constraints on column values, such as summing to 100.

The database inference component 108 automatically creates 304 a probabilistic graphical model which has a structure based on the relational database schema. A probabilistic graphical model is a collection of nodes connected by edges (also referred to as links). The examples described with reference to FIG. 6 use probabilistic graphical models referred to as factor graphs, where the nodes comprise factor nodes, which represent computations, and variable nodes which store probability distributions representing belief about variable values. The structure of the probabilistic graphical model (that is, the way the nodes are interconnected) may be related to the relational database schema. For example, nodes which represent table rows may be connected to nodes representing rows of other tables according to the foreign key arrangement in the relational database schema.

The type of probabilistic graphical model created may vary according to criteria such as one or more of: the application domain, user selection, computational resources available, memory availability and other criteria. Examples of types of probabilistic graphical model that may be used include but are not limited to: joint generalized Gaussian models, joint generalized Gaussian models with reduced dimensionality, heterogeneous mixture models, cross-cat mixture models, Bayes Nets.

The probabilistic graphical model may be acyclic which means that it has no loops and so inference is computationally tractable. For example, the database inference component 108 may check that the automatically generated probabilistic graphical model has no loops. If a loop is found the user may be informed at the graphical user interface 110. The loop may be omitted or the relational database divided into parts which may be modeled separately without loops and then recombined. Alternatively, approximate algorithm for inference can be used that work in the presence of loops in the graph.

In the example described below with reference to FIGS. 4 and 6 the probabilistic graphical model comprises a heterogeneous mixture model which assumes that the data in each table is generated as a mixture of component distributions and assigns a latent component assignment variable to each row of the table. The component distributions may be independent for each column and the distributions used depend on the type of the columns such as Gaussian for unbounded real, Bernoulli for Boolean, discrete for categorical, Poisson for integer, Beta for percentages, Gamma for non-negative real, von Mises-Fischer for geolocation in latitude/longitude format.

The database inference component 108 sends 306 the probabilistic graphical model and an address of a relational database (or part of a relational database) to the inference engine 104. The database inference component 108 receives inference results from the inference engine 308. The inference results comprise a plurality of probability distributions which comprise predictive probability distributions of a value associated with a cell, and predictive probability distributions of latent variables which are unobserved variables that are part of the model. There may be a predictive probability distribution for each relational database table cell represented in the model, where the probability distribution represents belief about the value of a data item in that cell. Users are able to select columns or rows to be omitted from inference and in that case, no probability distributions for cells in the selected columns or rows are available. This also happens where the database inference component 108 automatically selects columns to be omitted from inference. The probability distributions may be provided in any suitable form, for example, as samples taken from the probability distribution, as a mean and variance describing the probability distribution, as a histogram, or in other ways.

The database inference component 108 is able to store 312 the inference results. For example, the inference results may be stored in the relational database by overwriting the existing data which is erroneous and filling in previously empty cells. Another option is to add new columns and/or rows to enable the inference results to be incorporated in the relational database. In some examples the database inference component 108 stores the inference results at the database management tool 106 or at another entity in communication with the database management tool 106.

The database inference component 108 uses the inference results to respond 310 to database queries. The database inference component may also use the predictive probability distributions to do one or more of: identify outlying values in the relational database, identify erroneous values in the relational database, suggest corrections to erroneous values in the relational database, cluster cells in the relational database, identify cells or tables which influence the predictive probability distribution of a specified cell, identify cells for active learning. The database inference component may also export the probabilistic graphical model as a file. For example, to make predictions in another database of the same schema. The probabilistic graphical model may be viewable and editable at the graphical user interface for more advanced users.

Figure 4:
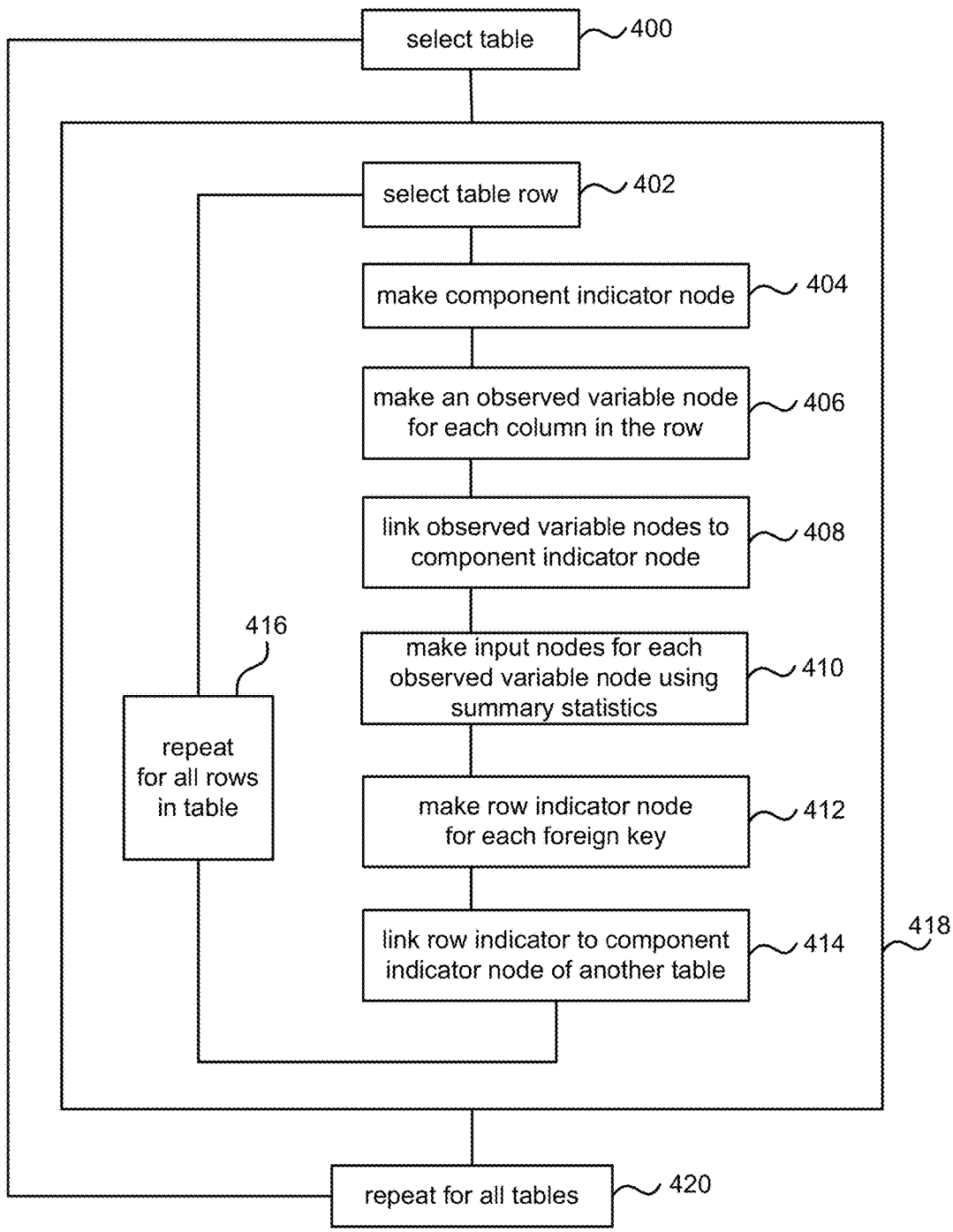
FIG. 4 is a flow diagram of an example method of automatically creating a probabilistic graphical model from a relational database schema.

More detail about how the probabilistic graphical model is automatically created is now given with reference to FIG. 4. This example is for the case where the probabilistic graphical model is a heterogeneous mixture model which assumes that the data in each table is generated as a mixture of component distributions and assigns a latent component assignment variable to each row of the table. The number of component distributions for each column may be specified in advance by an operator according to the application domain.

The database inference component 108 selects a table from the relational database and carries out a process 418 of creating and linking nodes to form part of a probabilistic graphical model. The process 418 is repeated 420 for all the tables in the relational database (or selected part of the relational database) and results in a single probabilistic graphical model.

For the selected table, a row is selected 402 and the database inference component 108 makes 404 a single component indicator node for the row. A component indicator node stores a probability distribution which represents belief about the component assignment variable for the row. The database inference component 108 makes 406 an observed variable node for each column in the row (except any that are to be omitted as mentioned above) and links 408 the observed variable nodes to the component indicator node. An observed variable node stores a probability distribution representing belief about the value held in a cell of the row (for example, a user's age in the case of the user table described with reference to FIG. 2, or a foreign key value in the case of the rating table described with reference to FIG. 2). Input nodes are made 410 for each observed variable node using the summary statistics. This enables prior knowledge about the observed variable node probability distributions to be taken into account. A row indicator node is made 412 for each foreign key in the selected row. A row indicator node stores a latent or observed variable representing which row in the foreign table the foreign key refers to. Each row indicator node is linked 414 to a component indicator node of another table according to the relational database schema. The next table row is then selected and the process repeats 416 for all the rows in the table.

Figure 5:
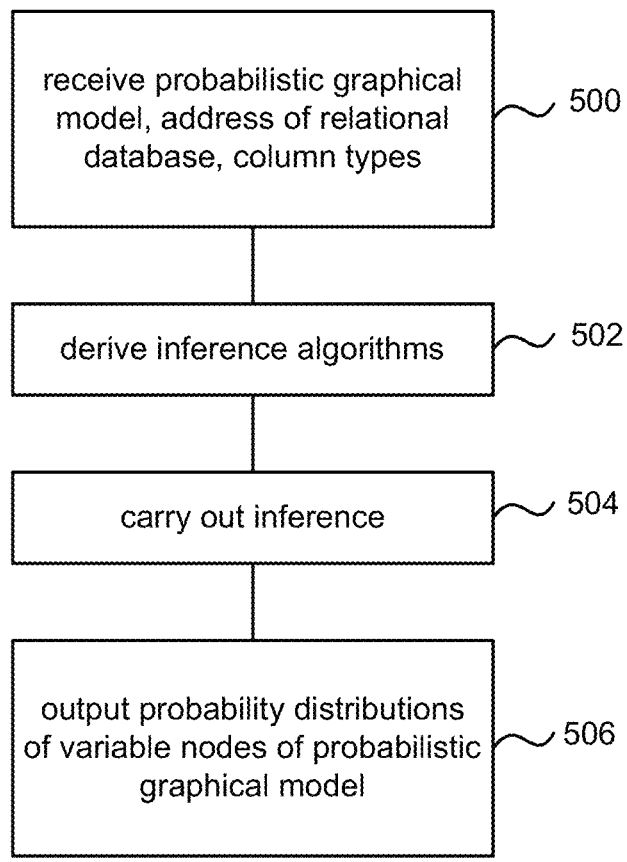
FIG. 5 is a flow diagram of a method at an inference engine.

FIG. 5 is a flow diagram of an example method at the inference engine 104 of FIG. 1. The inference engine receives 500 the probabilistic graphical model which has been automatically created by the database inference component 108. It also receives an address of the relational database (or part of a relational database) which is to provide the data for inference. The inference engine also receives the data value types of the columns of the relational database (except for any columns which are to be omitted from inference).

The inference engine may be any software framework which is able to receive a probabilistic graphical model and compile that to produce inference algorithms that may be applied to the data in the relational database. For example, a software framework which implements exact inference, a software framework which implements sampling, the Infer.NET™ software framework or others. In some examples the software framework comprises functionality to enable parts of a probabilistic model to be switched on or off based on selector variables. For example, the Infer.NET™ software framework comprises gates functionality which provides this type of switching ability. The inference engine may also comprise functionality to group elements of a probabilistic graphical model together into plates.

The inference engine compiles the probabilistic graphical model and so derives 502 inference algorithms. The inference algorithms are executed in order that inference is carried out 504 on the relational database or part of the relational database. The inference process may comprise a training phase where a first set of rows of the relational database tables are used as training data. A second set of rows of the relational database tables may then be used in a test phase to infer values. The inference engine outputs 506 probability distributions of the variable nodes of the probabilistic graphical model. This enables a probability distribution to be obtained for each cell of the relational database (except any cells omitted from inference) which expresses belief about the value of the cell's data.

Figure 6:
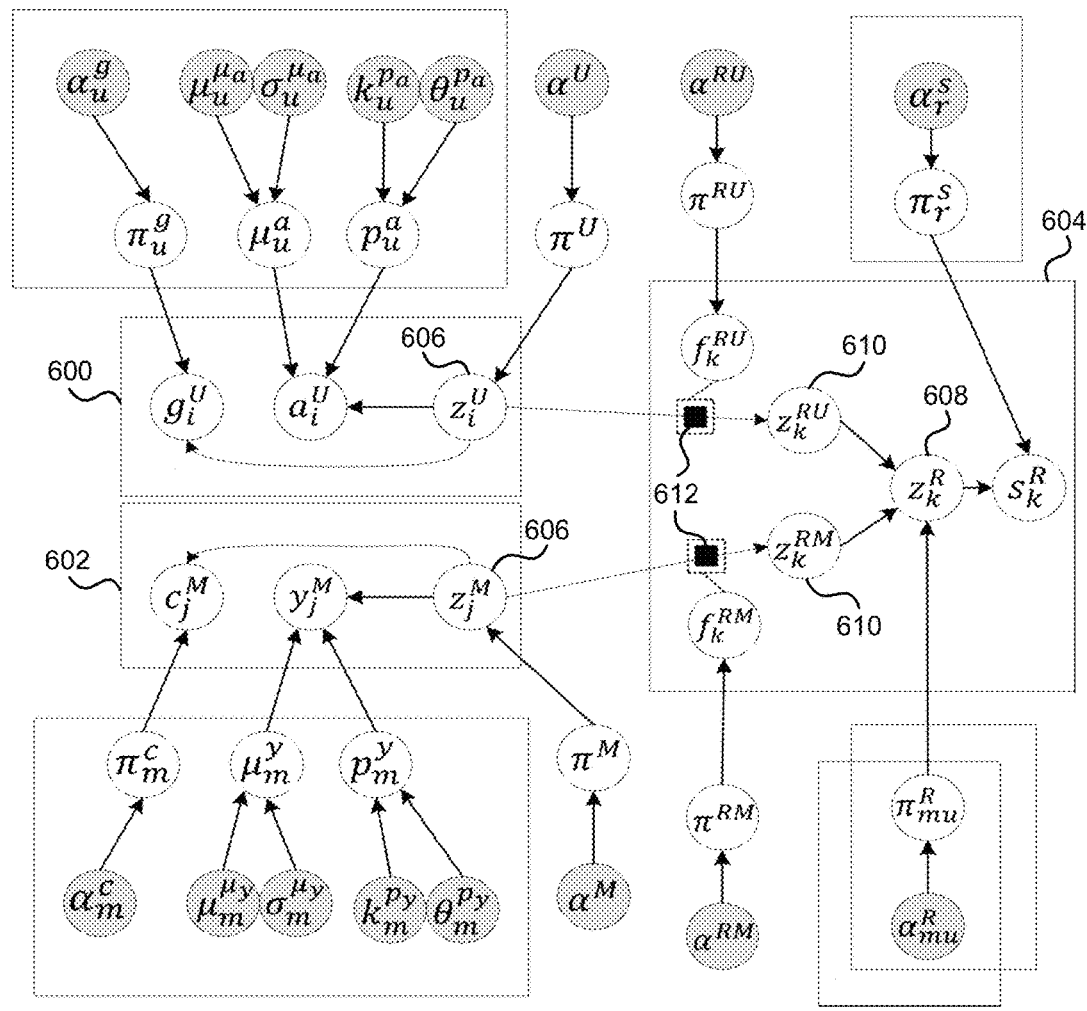
FIG. 6 is an example probabilistic graphical model.

FIG. 6 is an example probabilistic graphical model automatically produced by the database inference component 108 for the example relational database of FIG. 2. The structure of the probabilistic graphical model comprises a V shape (laying on its side) formed by the nodes 610 and 608 and this structure is related to the structure of the schema 300 of FIG. 2 which also comprises a V shape formed by the foreign key links from the rating table 306 to each of the movie table 304 and the user table 302. In this example the schema 300 is a simple one for clarity. In practice the schema may comprise many more links as the number of foreign keys and the number of tables increases. In that case, the structure of the probabilistic graphical model also becomes more complex because the structure of the probabilistic graphical model is related to that of the relational database schema.

The probabilistic graphical model of FIG. 6 comprises plate 600 which contains nodes representing variables for one row of the user table; plate 602 which contains nodes representing variables for one row of the movie table; and plate 604 which contains nodes representing variables for one row of the ratings table. The probabilistic graphical model repeats the plates 600, 602, 604 and associated plates for each of the rows in the tables but this is not shown in FIG. 6 for clarity.

The nodes in plate 600 may be formed using the method of FIG. 4. There is a single component indicator node 606 in plate 600 for the user table row linked to two observed variable nodes, one containing the symbol g denoting the user's gender and one containing the symbol a denoting the user's age. The other column of the user table (user name) is not being modeled.

There is a single component indicator node 606 in plate 602 for the movie table row linked to two observed variable nodes, one containing the symbol c denoting the movie category and one containing the symbol y denoting the movie year. The other column of the movie table, movie title, is not being modeled.

There is a single component indicator node 608 in plate 604 for one row of the ratings table. Node 608 is linked to an observed variable node with the symbol S denoting the score column of the ratings table. The ratings table has two foreign keys. A row indicator node is made for each foreign key. The row indicator nodes act as selectors by providing input to factor nodes 612 which are able to act as switches as denoted by the dotted squares. The nodes 610 receive copies of the values from variables nodes 606 via factor nodes 612 which are arranged to implement a switch mechanism to enable the appropriate table rows to be connected according to the foreign key information at row indicator nodes 612.

The variable nodes (observed variable nodes and latent variable nodes) are fed by input nodes using the summary statistics. This enables prior information about the columns to be taken into account and enables the component indicator nodes to be set to default values initially. The input nodes in FIG. 6 are all the nodes which are outside plates 600, 602 and 604.

Example graphical user interface displays are now discussed with reference to FIGS. 7 to 9. These examples are based on the relational database example of FIG. 2 and the probabilistic graphical model of FIG. 6.

Figure 7:
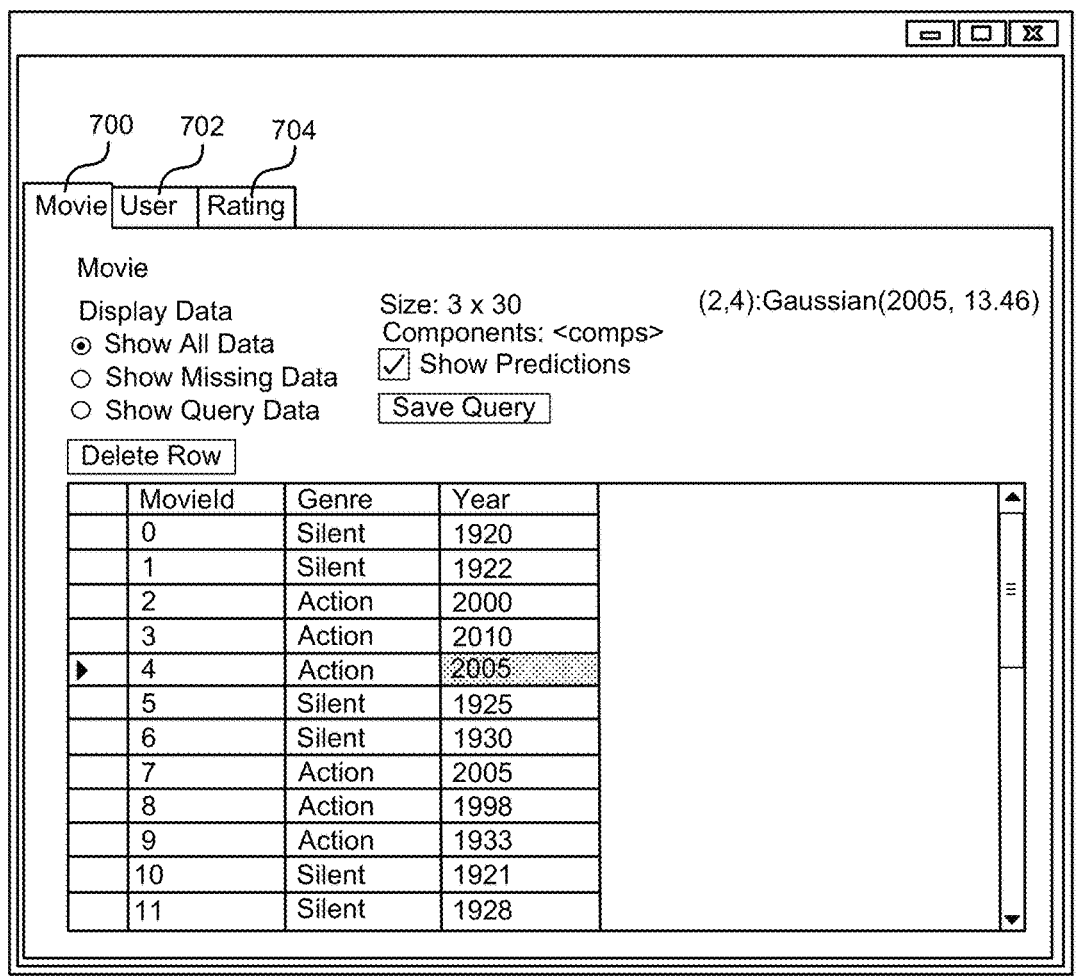
FIG. 7 is an example graphical user interface display.

FIG. 7 is an example graphical user interface display which may be made at the graphical user interface 110 of FIG. 1. This example shows how the inference results may be used to fill in cells with missing data. The graphical display has three tabs 700, 702, 704 to enable a user to switch between displays of the movie table, the user table and the ratings table. In this example part of the movie table is displayed. The user has selected a radio button to show all the data; that is the original data of the movie table with the filled in data from inference. The user also has the option to view only the missing data (i.e. empty cells) or to view query data (i.e. any rows and columns submitted to the relational database as part of a query). The size of the movie table is shown in this example as 3 columns by 20 rows. The option to show predictions is selected and the buttons for saving a query and deleting a row are not currently available. The row of current interest to the user is indicated by the black arrow head at row 4 and the shading of the cells in this row. The color of the shading may be used to indicate a cell which has been filled with inferred data. In this example, the year column of row 4 has been filled with the value "2005" and the display at the top right shows the probability distribution statistics for this cell as Gaussian (2005, 13.46). This indicates that the probability distribution returned from the inference engine for this cell is a Gaussian distribution with a mean of 2005 and a variance of 13.46. This is one example of how the inference results may be displayed to a user. For example, a percentage may be displayed to indicate certainty of the predicted value. In other examples marginal statistics such as expectation or variance may be displayed, MAP values such as the top-k most probable configurations, error bars, error ranges, plot lines, histograms or other types of displays which convey information about the predictive probability distributions.

Figure 8:
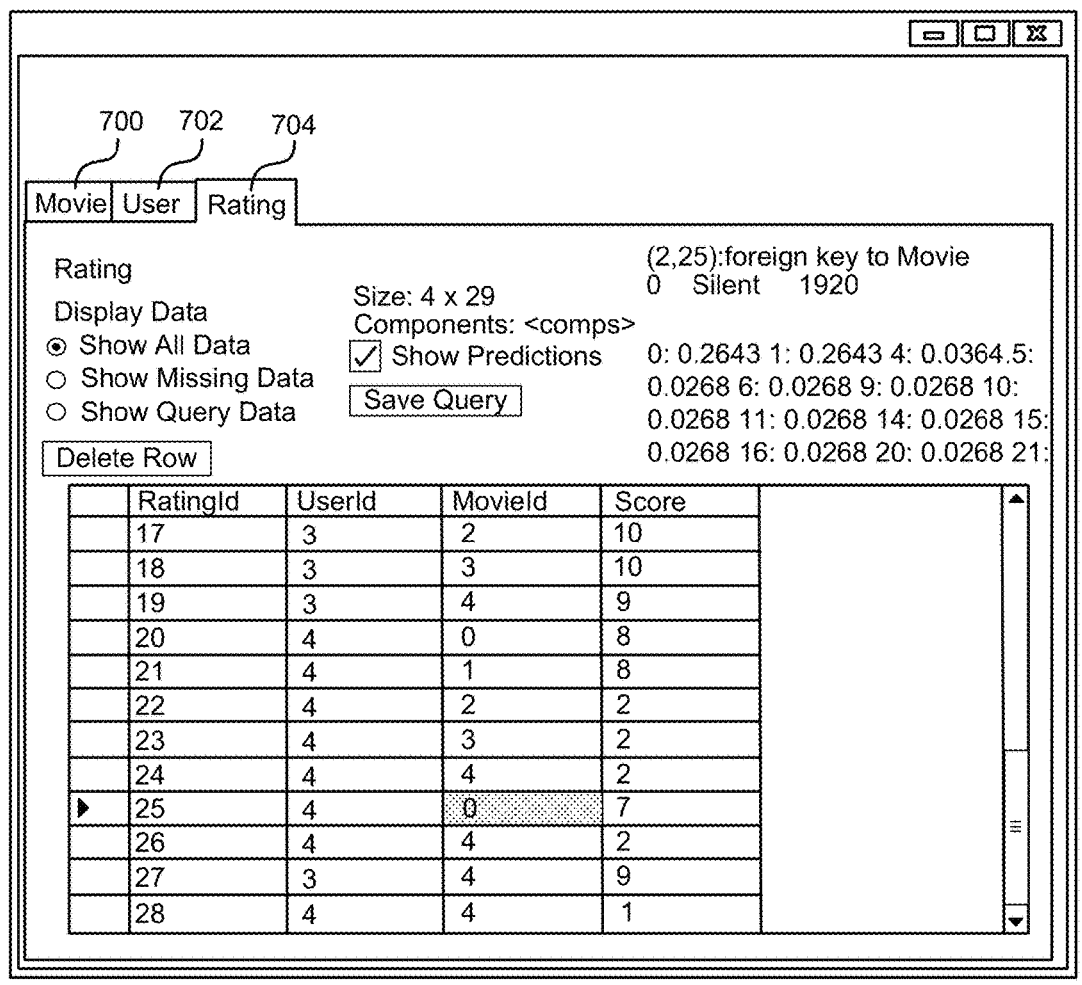
FIG. 8 is another example graphical user interface display.

FIG. 8 is another example graphical user interface display which may be made at the graphical user interface 110 of FIG. 1. This example shows how the inference results may be used to fill in foreign key cells with missing data. The graphical display has three tabs 700, 702, 704 to enable a user to switch between displays of the movie table, the user table and the ratings table. In this example part of the rating table is displayed. The user has selected a radio button to show all the data; that is the original data of the rating table with the filled in data from inference. The user also has the option to view only the missing data (i.e. empty cells) or to view query data (i.e. any rows and columns submitted to the relational database as part of a query). The size of the rating table is shown in this example as 4 columns by 29 rows. The option to show predictions is selected and the buttons for saving a query and deleting a row are not currently available. The row of current interest to the user is indicated by the black arrow head at row 25 and the shading of the cells in this row. The color of the shading may be used to indicate a cell which has been filled with inferred data. In this example, the foreign key to the movie table column of row 25 has been filled with the value "0" and the display at the top right shows the entries at row 0 of the movie table which are 0, silent, 1920 (as can be seen in FIG. 7). The display at the top right also shows the probability distribution statistics for this cell as a probability value for possible movie table row keys. The most certain movie table row key is 0 with a certainty of 0.2643. This is one example of how the inference results may be displayed to a user. Many other ways are possible.

Figure 9:
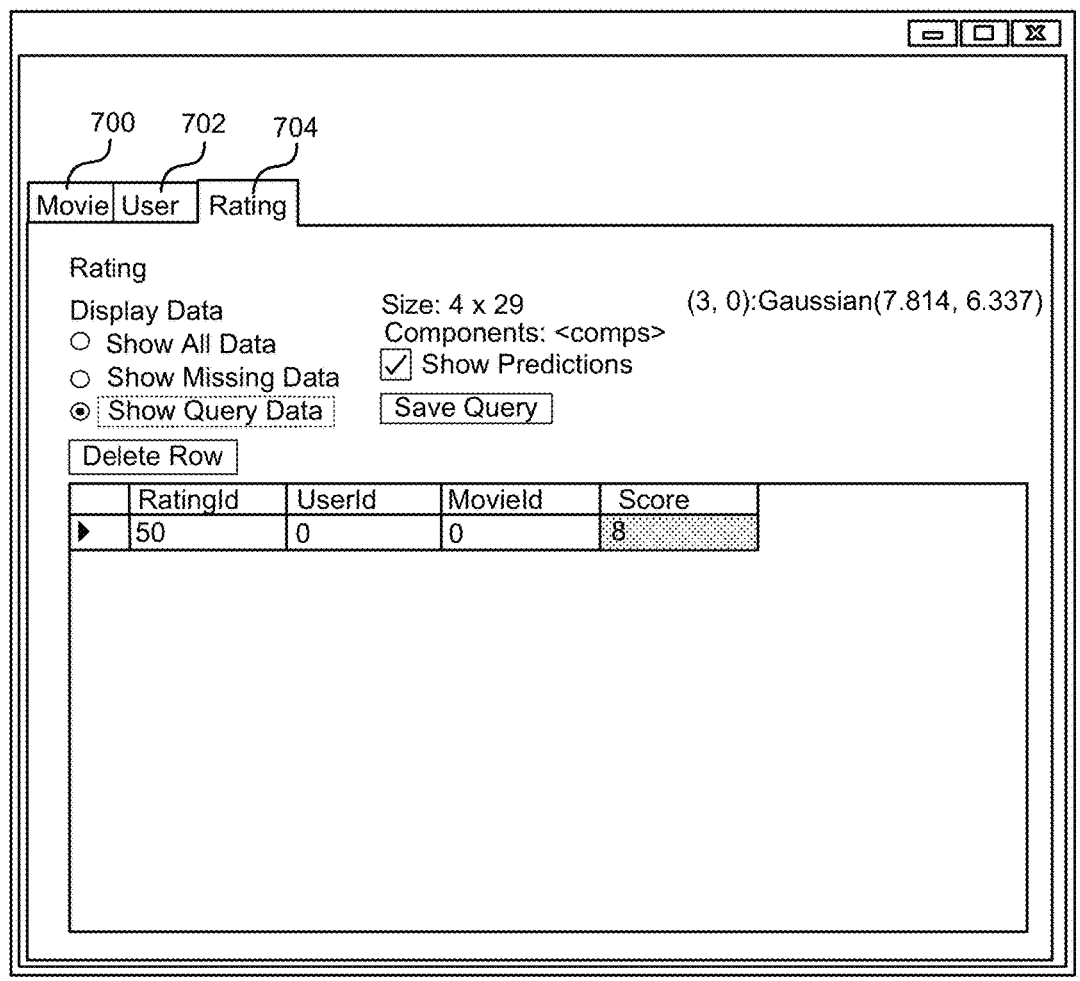
FIG. 9 is another example graphical user interface display.

FIG. 9 is another example graphical user interface display which may be made at the graphical user interface 110 of FIG. 1. This example shows how the inference results may be used to predict probability distributions for queries on the relational database.

As for FIGS. 7 and 8 the graphical display has three tabs 700, 702, 704 to enable a user to switch between displays of the movie table, the user table and the ratings table. In this example part of the rating table is displayed. The user has selected a radio button to show query data (i.e. any rows and columns submitted to the relational database as part of a query). In this example the query data comprises a single row of the rating table where the foreign key values to the user table and movie table are input by the user and the score is inferred as having the value 8. The display at the top right shows the probability distribution statistics for the score cell as Gaussian (7.814, 6.337). This indicates that the probability distribution returned from the inference engine for this cell is a Gaussian distribution with a mean of 7.814 and a variance of 6.337.

This example shows how an end user may submit a query which is, "if the user is the user specified in row 0 of the user table, and the movie is the movie specified in row 0 of the movie table, then what will the score be?". Other types of "what if" query may be made by changing the values submitted in the row. For example, an end user could ask what a foreign key value would be if the score and another foreign key value were known.

In the example in FIG. 9 the user is able to toggle back and forth between the movie, user and rating tables using table 700, 702 and 704 to understand what the foreign key values in the rating table mean. It is also possible for the graphical user interface display to be arranged to show the meaning of the foreign key values without the need to toggle between the tables. For example, using pop up windows, using a viewing pane or in other ways.

The graphical user interface may also comprise elements to enable a user to achieve any combination or one or more of: exclude at least one column or tables from inference, specify constraints between column values, specify potential dependencies between columns, re-run inference after accepting a change in the value of one or more cells of the relational database.

The predictive probability distributions provided by the inference engine may be used for other tasks as well as those described with reference to FIGS. 7 to 9. For example, to highlight cells having outlying values, identify potential errors, suggest corrections to potential errors, identify similarities between cells, identify differences between cells, cluster rows of the database, determine relations between columns of the data grid, identify existing cells or potential new rows and columns for which data would improve accuracy of predictions (active learning) and other tasks.

The predictive probability distributions from the inference engine may be used to highlight relationships and/or differences in a relational database. For example, between columns, or between rows of a table where similarities or differences in the predictive probability distributions are identified. Differences in the predictive probability distributions may be based on inferred model parameters such as association probabilities with mixture components or other latent variables. The similarities and/or differences may be displayed in the data grid at the graphical user interface using shading, colors or in any other way. In an example, a user may select a cell containing an inferred value (a value added to a cell by the database inference component) and the database inference component may highlight those cells that influence the inferred value the most. In another example, a user may select a cell containing an observed value and the database inference component may highlight those cells containing inferred values which it influences the most.

In an example, the database inference component may identify clusters of rows and create a new column of cluster labels. In some examples user guidance may be received such as where a user marks (in a new column) rows that he or she thinks are interesting and database inference component then fills in the blank cells in that new column so as to label all the rows as interesting or not according to the same criteria as the human user.

Figure 10:
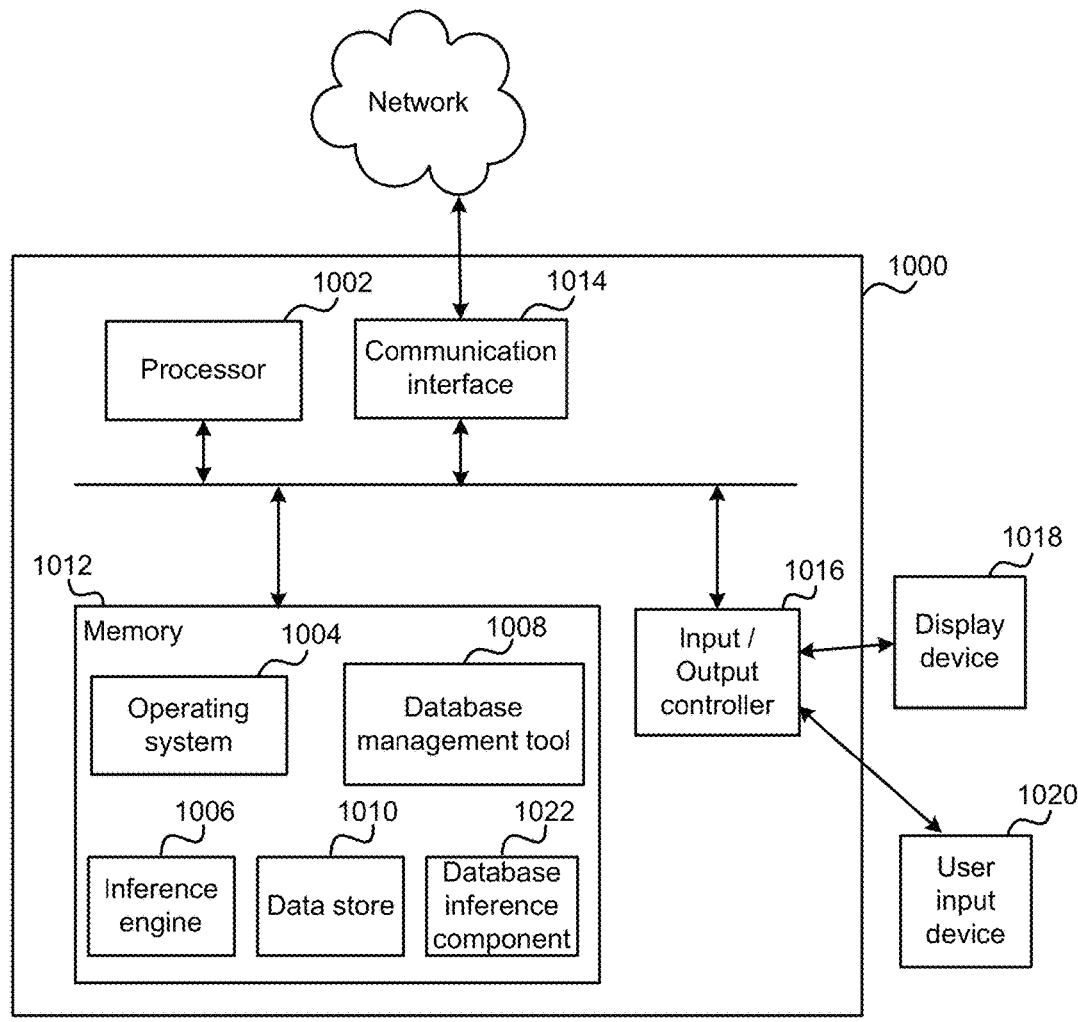
FIG. 10 illustrates an exemplary computing-based device in which embodiments of a relational database management system, or a database inference component may be implemented.

FIG. 10 illustrates various components of an exemplary computing-based device 1000 which may be implemented as any form of a computing and/or electronic device, and in which embodiments of a database inference component 108 for relational databases may be implemented.

Computing-based device 1000 comprises one or more processors 1002 which may be microprocessors, controllers or any other suitable type of processors for processing computer executable instructions to control the operation of the device in order to infer data of a relational database such as by completing missing values of a relational database including missing foreign keys; identifying outlier values in a relational database; identifying errors in a relational database and suggesting corrected values; highlighting differences and similarities between data in a relational database. In some examples, for example where a system on a chip architecture is used, the processors 1002 may include one or more fixed function blocks (also referred to as accelerators) which implement a part of the methods described herein in hardware (rather than software or firmware). Platform software comprising an operating system 1004 or any other suitable platform software may be provided at the computing-based device to enable an inference engine 1006, a database management tool 1008, and a database inference component 1022 to be executed on the device. In some examples the inference engine 1006 is not present at the device and may be accessed via communication interface 1014. In some examples the database management tool 1008 is not present at the device and may be accessed via communication interface 1014.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using communication interface 1014).

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface (NUI). This user input may be used to create, edit, delete, manipulate relational databases, issue queries to relational databases, omit columns or rows from inference, interact with graphical user interface 110, set sensitivity levels for outlier detection, and for other methods as described herein. In an embodiment the display device 1018 may also act as the user input device 1020 if it is a touch sensitive display device. The input/output controller 1016 may also output data to devices other than the display device, e.g. a locally connected printing device.

The input/output controller 1016, display device 1018 and optionally the user input device 1020 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   receiving, at an inference component implemented on a processor, a relational database schema and an identifier of a relational database using the relational database schema, wherein the relational database comprises a plurality of tables and each of the plurality of tables consists of a plurality of relational database table cells;
   automatically creating, by the inference component, a probabilistic graphical model of data values stored in the plurality of relational database table cells, including basing a structure of the probabilistic graphical model on the relational database schema of the identified relational database;
   using the probabilistic graphical model and the identifier of the relational database to obtain inference results from an inference engine, the inference results including, for each data value stored in each of the plurality of relational database table cells of the relational database, a predictive probability distribution of the data value in the relational database table cell;
   using the predictive probability distributions to indentify erroneous values in the relational database; and
   receiving, by a graphical user interface, input correcting the erroneous values in the relational database.

2. The method as claimed in claim 1 wherein at least one cell of the plurality of relational database table cells contains an inferred value, the inferred value added to the at least one cell by the inference component.

3. The method as claimed in claim 2 further comprising:
   highlighting, by the inference component, one or more cells of the plurality of relational database table cells that influence the inferred value of the at least one cell.

4. The method as claimed in claim 1 further comprising:
   using the predictive probability distributions to respond to queries made to the relational database.

5. The method as claimed in claim 1 further comprising:
   receiving a query in a form of one or more partially filled tables of the relational database and returning a response to the query comprising the tables having completed data values obtained from the predictive probability distributions.

6. The method as claimed in claim 1 further comprising:
   filling in a missing foreign key value in the relational database using the predictive probability distributions.

7. The method as claimed in claim 1 further comprising:
   exporting the probabilistic graphical model as a file.

8. A method at an end user device comprising:
   causing, by a processor, display of a graphical user interface;
   receiving user input at the graphical user interface specifying a query to a relational database, the user input indicating a partially filled table of the relational database, wherein the relational database comprises a plurality of tables and each of the plurality of tables consists of a plurality of relational database table cells;
   sending the query to an inference component having access to the relational database and to predictive probability distributions of each individual data value stored in each of the plurality of relational database table cells, wherein the inference component receives a relational database schema and an identifier of the relational database using the relational database schema and automatically creates a probabilistic graphical model having a structure based on the relational database schema; and receiving a response to the query comprising the indicated partially filled table with completed data and causing, by the processor when a user toggleable option indicates predictions are to be displayed, display of the response to the query at the graphical user interface, the completed data including one or more inferred values, the inferred values added to one or more cells of the indicated partially filled table by the inference component, wherein the user input specifying a query includes at least one missing foreign key value and the received response inlcudes a predicted value of the missing foreign key value.

9. The method as claimed in claim 8 further comprising:
causing, by the processor, display of the received response comprising completed data and certainties of the completed data.

10. The method as claimed in claim 8 further comprising:
receiving additional user input at the graphical user interface specifying at least one table or column of the relational database to be excluded from inference at an inference engine.

11. The method as claimed in claim 8 further comprising:
receiving additional user input at the graphical user interface specifying constraints between column values.

12. The method as claimed in claim 8 further comprising:
receiving additional user input at the graphical user interface specifying potential dependencies between columns.

13. A database inference component comprising:
a communications interface arranged to receive a relational database schema and an identifier of a relational database using the relational database schema, wherein the relational database comprises a plurality of tables and each of the plurality of tables consists of a plurality of relational database table cells; and
a hardware processor arranged to automatically create a probabilistic graphical model of data values stored in the plurality of relational database table cells, including basing a structure of the probabilistic graphical model on the relational database schema of the identified relational database,
wherein the communications interface is further arranged to use the probabilistic graphical model and the identifier of the relational database to obtain inference results from an inference engine, the inference results including, for each data value stored in each of the plurality of relational database table cells of the relational database, a predictive probability distribution of the data value in the relational database table cell, wherein based on the predictive probability distribution, erroneous values in the relational database are indentified and input correcting the erroneous values in the relational database is received.

14. The database inference component as claimed in claim 13 wherein at least one cell of the plurality of relational database table cells contains an inferred value, the inferred value added to the at least one cell by the database inference component.

15. The database inference component as claimed in claim 13 which is integral with a database management tool for sending queries to the relational database and receiving responses to the queries.

16. The database inference component as claimed in claim 15, further highlighting one or more cells of the plurality of relational database table cells that influence an inferred value of the at least one cell.

17. The database inference component as claimed in claim 13 arranged to use the predictive probability distributions to respond to queries made to the relational database.

18. The database inference component as claimed in claim 13 being at least partially implemented using hardware logic selected from any one or more of: a field-programmable gate array, a program-specific integrated circuit, a program-specific standard product, a system-on-a-chip, a complex programmable logic device, a graphics processing unit (GPU), texturing hardware.

19. The method as claimed in claim 5 further comprising:
wherein the query includes at least one missing foreign key value and the returned response to the query further comprises includes a predicted value of the missing foreign key value.

20. The database inference component as claimed in claim 13 wherein one or more loops of the relational database are displayed by a graphical user interface.

* * * * *